July 5, 1949.　　　　　F. W. OETKEN　　　　　2,475,195
LAWN MOWER

Filed Feb. 10, 1947　　　　　　　　　　　　　　　2 Sheets-Sheet 1

Inventor
Fred W. Oetken
By *Clarence A. O'Brien and Harvey B. Jackson*
Attorney

July 5, 1949. F. W. OETKEN 2,475,195
LAWN MOWER
Filed Feb. 10, 1947 2 Sheets-Sheet 2

Inventor

Fred W. Oetken

By *Clarence A. O'Brien and Harvey B. Jacobson*
Attorneys

Patented July 5, 1949

2,475,195

UNITED STATES PATENT OFFICE 2,475,195

LAWN MOWER

Fred W. Oetken, Albert, Kans.

Application February 10, 1947, Serial No. 727,545

2 Claims. (Cl. 56—249)

This invention relates generally to lawn mowers, and more particularly to a lawn mower having a traction wheel supported on a frame straddling this wheel, and provided with novel sickle operating means, and novel bracket means associated with said frame and with an adjustable handle whereby the lawn mower is propelled by the operator.

An object of this invention is to provide a lawn mower which has few moving parts, and which is adapted for manufacture with a relatively narrow cutting head, so that the machine may be used for special purposes such as cutting along sidewalks and in confined spaces where a lawn mower having the conventional side wheel suspension cannot be used.

Another object of this invention is to provide a lawn mower which can be used to top tall weeds and a rank growth of grass, in successive stages, or prior to the use of a conventional lawn mower, it being understood that in order to use the device in this manner it is only necessary to adjust the handle so that the device can be conveniently disposed with the cutter head elevated to the desired height above the ground.

Another important object of this invention, ancillary to the preceding objects, is the provision of an adjustable handle in a lawn mower, so that the cutter head will be held at the desired height above the ground, when this handle is adjusted properly and held naturally or comfortably by the operator, it having been found that without such adjustability of the handle devices of this character are awkward and generally unsatisfactory.

Another object of this invention is to simplify the means for transferring power from the traction wheel to the reciprocating sickle.

And a last object to be specifically mentioned is to provide a device of this character which is relatively inexpensive and practicable to manufacture, simple to use, and which is so designed as to provide for generally efficient and durable service.

With these and other objects definitely in view, this invention resides in certain novel features of construction, combination and arrangement of parts and portions as will be hereinafter described in detail and particularly set forth in the appended claims, reference being had to the accompanying drawings which form a material part of this application, and in which:

Similar characters of reference designate similar or identical parts and portions throughout the specification and throughout the several views of the drawings.

Figure 2:
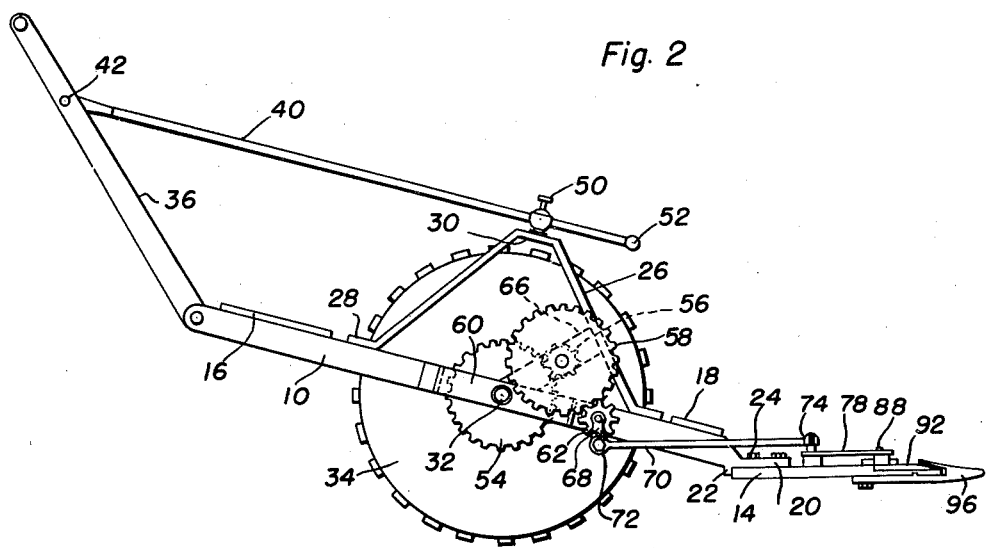
Figure 2 is a side elevational view of the assembled lawn mower.
Figure 6:
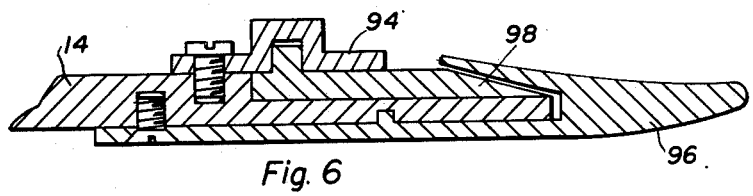
Figure 6 is a vertical sectional view of the guard member, reciprocating sickle and contiguous structure, the view being taken on the line 6—6 in Figure 1.

Referring now to the drawings in detail, it will be noted that the frame is comprised of three principal members, the two parallel and spaced bars 10 and 12 and the plate 14 disposed transversely of and at the front ends of the bars 10 and 12. These bars are secured together at one end by a cross bar 16, and at the other end by a cross bar 18 which may be formed integral with the attachment flanges 20 on the forward ends of the bars 10 and 12, or this cross bar may be spaced therefrom as indicated in Figure 2, the attachment flanges 20 being disposed angularly to the bars 10 and 12 and formed with a heel 22 to engage a rear edge of the plate 14. In either case, the plate 14 will be secured to the attachment flanges 20 by some such means as the stud bolts 24, and the plate 14 will be disposed at an acute angle with the bars 10 and 12.

A pair of V-members 26, vertically disposed and having their terminal portions bent as at 28 for rigid securement to the bars 10 and 12, are joined by a cross plate 30 which spans the space between the bars 10 and 12, and is disposed substantially vertically above the axle 32 which is mounted on the bars 10 and 12 and supports the frame on the traction wheel 34.

Figures 7, 8:
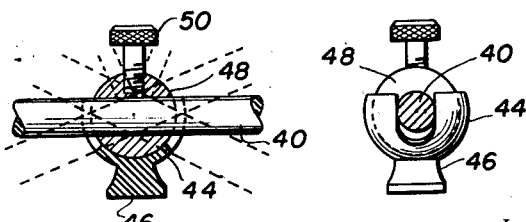
Figure 7 is a fragmentary view of the link used to angularly adjust the handle, and the universal clamping means associated therewith, the view being in elevation with a portion of the base of the clamp shown in vertical section.
Figure 8 is a side elevational view of the structure shown in Figure 7.

A T-handle 36 is pivotally secured as by the cross bar 38 to the rear ends of the bars 10 and 12, and extends angularly upwardly to provide manual means for the control and operation of the lawn mower. The angular adjustment of this T-handle 36 is provided for by a link 40, pivotally secured at one end to the handle 36, as at 42, and adjustably secured to the cross bar 30 by means of the universal clamping member represented in detail in Figures 7 and 8. This universal clamp includes a socket member 44 secured by an integral base 46 to the cross bar 30, and adapted to retain a ball 48 which is drilled to receive the link 40. This link 40 is slidably associated with the ball 48 and a thumb screw 50 is threadably associated with the ball 48 to clamp the link 40 to the ball 48, for any required adjustment of the handle 36. A knob terminal 52 is provided on the end of the link 40 to prevent the link 40 from being completely withdrawn from the ball 48.

Figure 1:
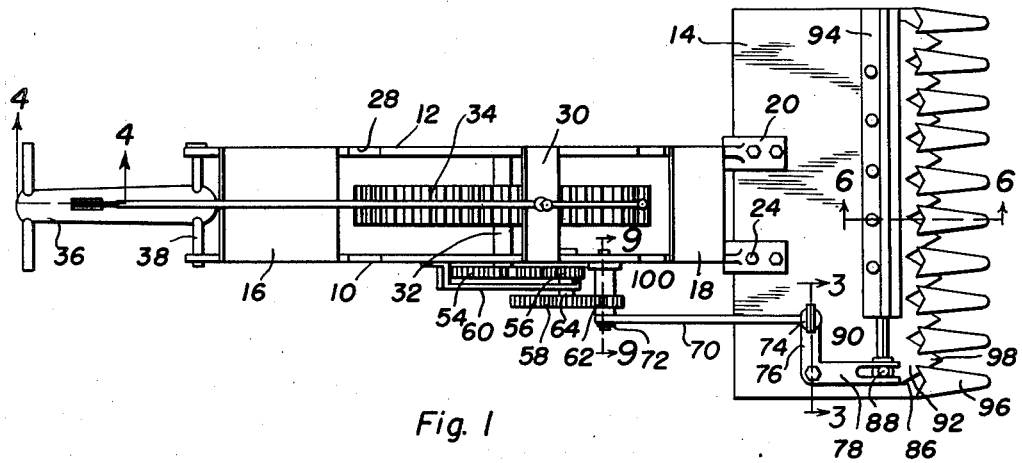
Figure 1 is a top plan view of the assembled lawn mower.
Figure 3:
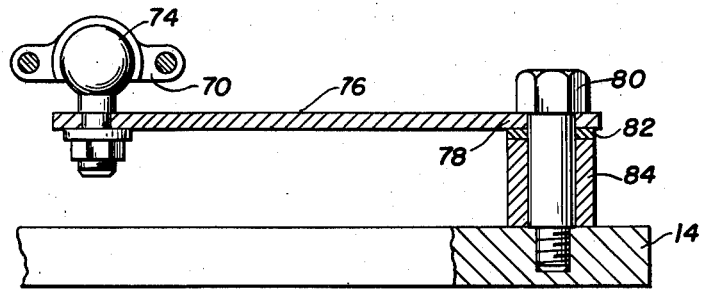
Figure 3 is an enlarged fragmentary detail view of a portion of the bell crank and contiguous structure, the view being taken on the line 3—3 in Figure 1.
Figure 4:
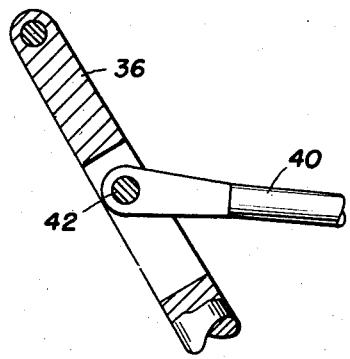
Figure 4 is a vertical sectional view taken on the line 4—4 in Figure 1.
Figure 5:
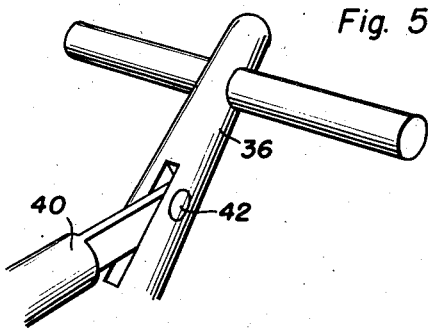
Figure 5 is a fragmentary perspective view of the same structure as that shown in Figure 4.

A system of reduction gears of any suitable character and represented in the drawings by an initial drive gear 54 rigidly secured on the end of the axle 32, a smaller diameter gear wheel 56 mounted to turn with a larger gear wheel 58, these meshed gear wheels being mounted on the brackets 60 and 66 rigidly secured to the frame in any suitable manner, as by welding, and a spiral driven pinion 62. The inner end of the shaft 64 upon which the gear wheels 56 and 58 are secured, is mounted on an obliquely disposed bracket 66, shown in dotted lines in Figure 2, and this bracket may be in the same plane as the bars 10 and 12 and the upright V-members 26, to which this bracket 66 is terminally secured. The necessary provision of anti-friction bearings, thrust bearings and other detailed structure required to properly mount these gear wheels need not be detailed here, but it should be noted that the pinion 62 is so positioned as to provide clearance for a crank 68 which is rigidly secured to the pinion 62, to turn therewith and to provide reciprocatory motion to the pitman 70, secured by a conventional pitman bearing 72 to this crank 68. The other end of the pitman 70 is provided with a ball and socket joint 74, a portion of the joint being formed ordinarily integrally with the end of the arm 76 of a bell crank 78. This bell crank 78 is pivotally secured to the plate 14 by a stud bolt 80, friction washer 82, and spaced upward from the plate 14 by a sleeve 84, all as clearly illustrated in Figure 3. The forward end of the bell crank 78 is bifurcated as at 86 to frictionally engage a transversely disposed pin 88, secured adjacent one end of the reinforcing rib 90 of the sickle 92. This sickle 92 is of multi-toothed design and is reciprocatively mounted on the plate 14 by means of a journaled guide member 94 and studs securing this journal guide member to the plate in spaced relation with the reciprocating sickle mounted therebetween, according to conventional practice. The forward edge of the plate 14 is provided with a plurality of guard members 96, corresponding in number with the number of teeth 98 in the multi-toothed sickle, according to well known construction of such devices.

Figure 9:
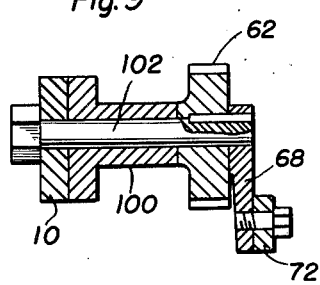
Figure 9 is a vertical sectional view taken on the line 9—9 in Figure 1.

Many and various useful modifications in the details of construction of this invention, relating for example, to such details as the provision of the spacing sleeve 100 between the gear 62 and the frame bar 10, to provide for auxiliary support to the stub shaft 102, as illustrated in Figure 9, are thought to be well within the scope and spirit of this invention, the essential features of this invention being not altered by modification of these details.

The operation of this invention will be reasonably obvious from a consideration of the foregoing description of the mechanical details thereof but, in recapitulation, it may be noted that the handle 36 is adjusted to adapt the machine for the particular use and to the particular operator, whereupon the machine may be propelled forwardly, the traction wheel 34 providing power for the machine.

Though there has been shown a particular embodiment of this invention, this application is not limited to this particular embodiment, but it is desired to include in the scope of this invention the construction, combination and arrangement of parts and portions substantially as set forth in the appended claims.

Having thus described this invention what is claimed as new and desired to be secured by Letters Patent is:

1. A lawn mower including a traction wheel and axle, a substantially horizontal frame supported on said axle and straddling said wheel, a reciprocating sickle driven by said axle, an upwardly extending bracket on said frame and straddling said wheel, a handle pivotally secured to one end of said frame, and a link adjustably secured to and between the upper portions of said handle and said bracket.

2. A lawn mower including a traction wheel and axle, a substantially horizontal frame supported on said axle and straddling said wheel, a reciprocating sickle driven by said axle, an upwardly extending bracket on said frame and straddling said wheel, a handle pivotally secured to one end of said frame, and a link adjustably secured to and between the upper portions of said handle and said bracket, said bracket comprising a transversely disposed member terminally supported by two substantially vertical members secured to each side of the frame.

FRED W. OETKEN.

REFERENCES CITED

The following references are of record in the file of this patent:

UNITED STATES PATENTS

| Number | Name | Date |
| --- | --- | --- |
| 362,535 | Powell | May 10, 1887 |
| 2,177,357 | Wagner | Oct. 24, 1939 |